United States Patent
Li et al.

(10) Patent No.: US 11,156,765 B2
(45) Date of Patent: Oct. 26, 2021

(54) BACK PLATE HAVING CONNECTING AND SUPPORTING PORTIONS FOR A DISPLAY

(71) Applicants: Chongqing BOE Optoelectronics Technology Co., Ltd., Chongqing (CN); BOE TECHNOLOGY GROUP CO., LTD., Beijing (CN)

(72) Inventors: Dengqian Li, Beijing (CN); Yansheng Sun, Beijing (CN); Liang Gao, Beijing (CN); Sijun Lei, Beijing (CN); Yuxu Geng, Beijing (CN); Chaojie Zhang, Beijing (CN); Jian Chen, Beijing (CN); Song Liu, Beijing (CN); Wei Dai, Beijing (CN); Fengzhen Bu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/902,658

(22) Filed: Jun. 16, 2020

(65) Prior Publication Data
US 2021/0165157 A1    Jun. 3, 2021

(30) Foreign Application Priority Data
Nov. 29, 2019    (CN) .......................... 201922119361.9

(51) Int. Cl.
*F21V 8/00*    (2006.01)

(52) U.S. Cl.
CPC ......... *G02B 6/0088* (2013.01); *G02B 6/0046* (2013.01); *G02B 6/0051* (2013.01); *G02B 6/0055* (2013.01)

(58) Field of Classification Search
CPC .. G02B 6/0086; G02B 6/0088; G02B 6/0093; G02F 1/133308; G02F 2001/133322
See application file for complete search history.

(56) References Cited

U.S. PATENT DOCUMENTS

| 6,954,238 B2 * | 10/2005 | Liu ................... G02F 1/133382 349/161 |
| 8,721,156 B2 * | 5/2014 | Zhang ............... G02F 1/133308 362/632 |
| 2018/0106958 A1 | 4/2018 | Zeng et al. |

FOREIGN PATENT DOCUMENTS

| CN | 203551908 U | 4/2014 |
| CN | 105785624 A | 7/2016 |
| CN | 208636617 U | 3/2019 |

* cited by examiner

*Primary Examiner* — Robert J May
(74) *Attorney, Agent, or Firm* — McDermott Will and Emery LLP

(57) ABSTRACT

A back plate includes a base plate, a plurality of connecting plates and a plurality of support plates. The base plate has a first surface. The plurality of connecting plates are fixed to at least two edges of the base plate, and each connecting plate extends along a direction substantially perpendicular to the first surface. Each support plate is fixed to an end of a respective one of the plurality of connecting plates away from the base plate, and is substantially parallel to the first surface.

18 Claims, 8 Drawing Sheets

BACK PLATE HAVING CONNECTING AND SUPPORTING PORTIONS FOR A DISPLAY

CROSS-REFERENCE TO RELATED APPLICATION

This application claims priority to Chinese Patent Application No. 201922119361.9 filed Nov. 29, 2019, which is incorporated herein by reference in its entirety.

TECHNICAL FIELD

The present disclosure relates to the field of display technologies, and in particular, to a back plate, a backlight module and a display device.

BACKGROUND

A backlight module is used for providing backlight for a display panel, and is an important component in a display device.

The backlight module typically includes a support frame and a mold frame. The support frame cooperates with the mold frame to can fix components such as optical films, a light source and a light guide plate and realize an assembly of the backlight module and the display panel.

SUMMARY

In one aspect, a back plate is provided. The back plate includes a base plate, a plurality of connecting plates and a plurality of support plates. The base plate includes a first surface. The plurality of connecting plates are fixed to at least two edges of the base plate, each connecting plate extends along a direction substantially perpendicular to the first surface. Each support plate is fixed to an end of a respective one of the plurality of connecting plates away from the base plate, and is substantially parallel to the first surface.

In some embodiments, each support plate extends in a direction pointing to a central axis of the base plate. The central axis of the base plate is a line perpendicular to the first surface of the base plate and passing through a center of the base plate.

In some embodiments, each support plate extends in a direction away from a central axis of the base plate. The central axis of the base plate is a line perpendicular to the first surface of the base plate and passing through a center of the base plate.

In some embodiments, an orthographic projection of an end of the support plate away from a corresponding connecting plate on a plane where the first surface of the base plate is located is outside the base plate.

In some embodiments, an edge of the at least two edges of the base plate has a recess extending into the base plate. The base plate is connected to a connecting plate at the recess and an orthographic projection of the recess on the plane where the first surface is located at least partially overlaps with an orthographic projection of a corresponding support plate on the plane. An end face of the corresponding support plate away from the connecting plate is substantially flush with an end face of the base plate except the recess.

In some embodiments, the plurality of connecting plates are fixed to at least two opposite edges of the base plate, and each edge is provided with at least one connecting plate and at least one support plate.

In some embodiments, the further includes a plurality of limit plates. The plurality of limit plates are fixed to the at least two opposite edges of the base plate, each limit plate extends along the direction substantially perpendicular to the first surface, and each edge of the at least two opposite edges is provided with at least one limit plate. In a direction perpendicular to the first surface, a distance between the first surface and an end face of a limit plate away from the base plate is greater than a distance between the first surface and a surface of the support plate facing away from the base plate.

In some embodiments, the base plate has two groups of edges, and each group of edges includes two opposite edges. The back plate includes four support plates and four connecting plates, and each edge of the base plate is provided with one support plate and one connecting plate.

In some embodiments, each of the four support plates extends in a direction pointing to a central axis of the base plate, and the four support plates includes a first support plate and three second support plates, a width of the first support plate is greater than a width of each second support plate. The central axis of the base plate is a line perpendicular to the first surface of the base plate and passing through a center of the base plate.

In some embodiments, a width of each support plate is greater than or equal to 0.5 mm, and less than or equal to 1.6 mm.

In some embodiments, a connecting plate and the base plate have a first included angle therebetween, and the connecting plate and a corresponding support plate have a second included angle therebetween. The first included angle and the second included angle are greater than or equal to 88°, and less than or equal to 92°.

In another aspect, a backlight module is provided. The backlight module includes the back plate described in the above embodiments and a light guide plate. The light guide plate is disposed on the first surface of the base plate.

In some embodiments, at least one support plate extends in a direction pointing to a central axis of the base plate. Along the central axis of the base plate, a distance between the first surface and a surface of the at least one support plate proximate to the base plate is greater than a distance between the first surface and a surface of the light guide plate facing away from the base plate. The central axis of the base plate is a line perpendicular to the first surface of the base plate and passing through a center of the base plate.

In some embodiments, in at least one connecting plate connected to the at least one support plate, along a direction perpendicular to a plane that is perpendicular to the first surface and substantially parallel to a connecting plate, a maximum distance between an end face of the light guide plate proximate to the connecting plate and a surface of the connecting plate facing the light guide plate is greater than or equal to 0.8 mm, and less than or equal to 1.5 mm.

In some embodiments, at least one support plate extends in a direction away from a central axis of the base plate. In at least one connecting plate connected to the at least one support plate, along a direction perpendicular to a plane that is perpendicular to the first surface and substantially parallel to a connecting plate, a maximum distance between an end face of the light guide plate proximate to the connecting plate and a surface of the connecting plate facing the light guide plate is greater than or equal to 0.6 mm, and less than or equal to 1.5 mm.

In some embodiments, the backlight module further includes an optical film disposed on a side of the light guide plate away from the base plate. Along a direction perpendicular to a plane that is perpendicular to the first surface and substantially parallel to a connecting plate, a distance between a surface of a support plate facing the optical film and an end face of the optical film proximate to the support plate is greater than or equal to 0.3 mm, and less than or equal to 1.5 mm.

In another aspect, a display device is provided. The backlight module includes a display panel, the backlight module described in the above embodiments. The display panel is disposed on a surface of each support plate facing away from the base plate in the backlight module.

In some embodiments, in a direction perpendicular to the first surface, a distance between the first surface and an end face of a limit plate away from the base plate is less than or equal to a distance between the first surface and a surface of the display panel away from the base plate.

BRIEF DESCRIPTION OF THE DRAWINGS

In order to describe technical solutions in embodiments of the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, accompanying drawings in the following description may be regarded as schematic diagrams, and are not limitations on an actual size of a product, an actual process of a method and an actual timing of signals that the embodiments of the present disclosure relate to.

DETAILED DESCRIPTION

Figure 1:
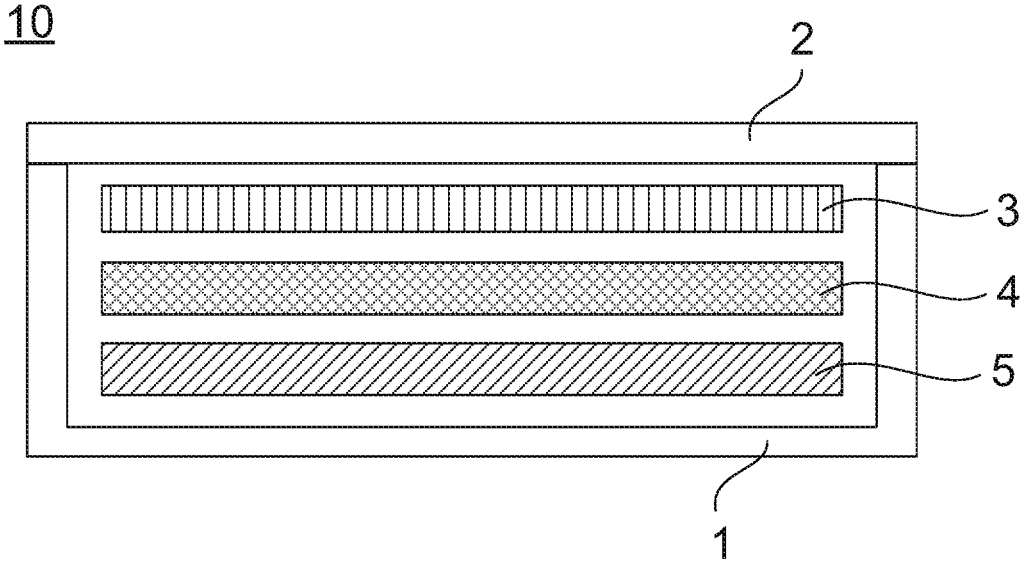
FIG. 1 is a schematic diagram of a display device, in accordance with some embodiments of the present disclosure.

Technical solutions in some embodiments of the present disclosure will be described clearly and completely in combination with accompanying drawings below. Obviously, the described embodiments are merely some but not all embodiments of the present disclosure. All other embodiments obtained on a basis of embodiments of the present disclosure by a person of ordinary skill in the art shall be included in the protection scope of the present disclosure.

Unless the context requires otherwise, terms "comprise", "include" and other forms thereof such as the third-person singular forms "comprises", "includes" and the present participle forms "comprising" and "including" in the description and the claims are construed as an open and inclusive meaning, i.e., "included, but not limited to". In the description, terms such as "one embodiment", "some embodiments", "exemplary embodiments", "example", "some examples", or "specific example" are intended to indicate that specific features, structures, materials or characteristics related to the embodiment(s) or the example(s) are included in at least one embodiment or example of the present disclosure. Schematic representations of the above terms do not necessarily refer to the same embodiment(s) or example(s). In addition, the specific features, structures, materials or characteristics may be included in any or more embodiments/examples in any suitable manner.

Terms such as "first" and "second" are used for descriptive purposes only, and are not to be construed as indicating or implying the relative importance or implicitly indicating the number of indicated technical features. Thus, features defined by "first" and "second" may explicitly or implicitly include one or more of the features. In the description of the embodiments of the present disclosure, a term "a plurality of" means two or more unless otherwise specified.

Exemplary embodiments are described herein with reference to sectional views and/or plan views as idealized exemplary drawings. In the drawings, thicknesses of layers and regions may be exaggerated for clarity. Accordingly, variations in shape relative to the drawings due to, for example, manufacturing techniques and/or tolerances may be envisaged. Therefore, exemplary embodiments should not be construed as being limited to the shapes of the regions shown herein, but include deviations in shape due to, for example, manufacturing. For example, an etched region shown as a rectangle generally has a curved feature. Accordingly, regions illustrated in the drawings are schematic in nature and their shapes are not intended to illustrate actual shapes of the regions in a device and are not intended to limit the scope of the exemplary embodiments.

In addition, unless otherwise indicated, the terms such as "front", "rear, " "lower, upper" and the like are only for ease of description, and are not limited to one location or one spatial orientation. "A and/or B" includes the following combinations of A and B: only A, only B, and a combination of A and B.

Some embodiments of the present disclosure provide a display device. The display device may be a display, a mobile phone, a computer, an electronic watch, an electronic book, etc., may be a flexible display device, or may also be a non-deformable display device.

As shown in FIG. 1, the display device 10 may include a display panel 3 and a backlight module 4. The backlight module 4 may be used to support the display panel 3.

The display device 10 is, for example, a liquid crystal display (LCD) device, and the display panel 3 may be a liquid crystal display panel. In this case, the display device 10 may further include a frame 1, a cover plate 2, and a circuit board 5. The cover plate 2 is assembled with the frame 1 to form a chamber for receiving components such as the display panel 3, the backlight module 4 and the circuit board 5. The display panel 3 is closer to the cover plate 2 relative to the backlight module 4 and the circuit board 5, the circuit board 5 is further from the cover plate 2 relative to the display panel 3 and the backlight module 4, and the backlight module 4 is disposed between the display panel 3 and the circuit board 5.

Of course, the display device 10 may also be another type of display device. For example, the display device 10 may be a QD-LCD (Quantum Dot LCD). The following embodiments are described by taking the display device 10 being the LCD device as an example. With regard to the structure of the display device of another type, reference may be made to the description of the LCD device, and details will not be repeated herein.

Figure 2:
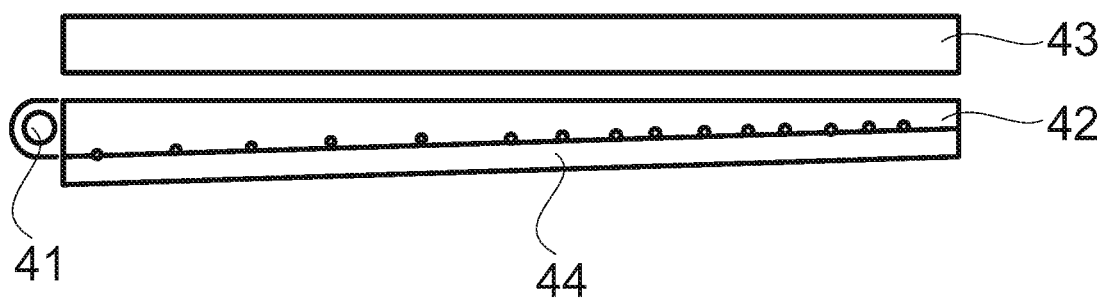
FIG. 2 is a schematic diagram of a backlight module, in accordance with some embodiments.

As shown in FIG. 2, in some examples, the backlight module 4 includes a light source 41, a light guide plate 42, and optical films 43 disposed at a light exit surface of the light guide plate 42. The optical films 43 may include a diffusion film which may increase uniformity of light to be incident onto the display panel 3. The optical films 43 may further include a brightness enhancement film (BEF) and/or a dual brightness enhancement film (DBEF), or may further include a composite brightness enhancement film that combines the functions of the BEF and the DBEF. The BEF may be, for example, a prism sheet. The light guide plate 42 may be a wedge type light guide plate or a flat type light guide plate. FIG. 2 shows an example in which the light guide plate 42 is the wedge type light guide plate.

As shown in FIG. 2, the light source 41 may be arranged along at least one edge of the light guide plate 42 and the light emitting surface of the light source 41 faces the light guide plate 42. In this case, the backlight module 4 is an edge-lit backlight module.

The light source 41 is, for example, a light source composed of light-emitting diodes (LEDs).

In some embodiments, as shown in FIG. 2, the backlight module 4 further includes a reflective sheet 44, and the reflective sheet 44 is disposed at a side of the light guide plate 42 away from the optical films 43.

Figure 3:
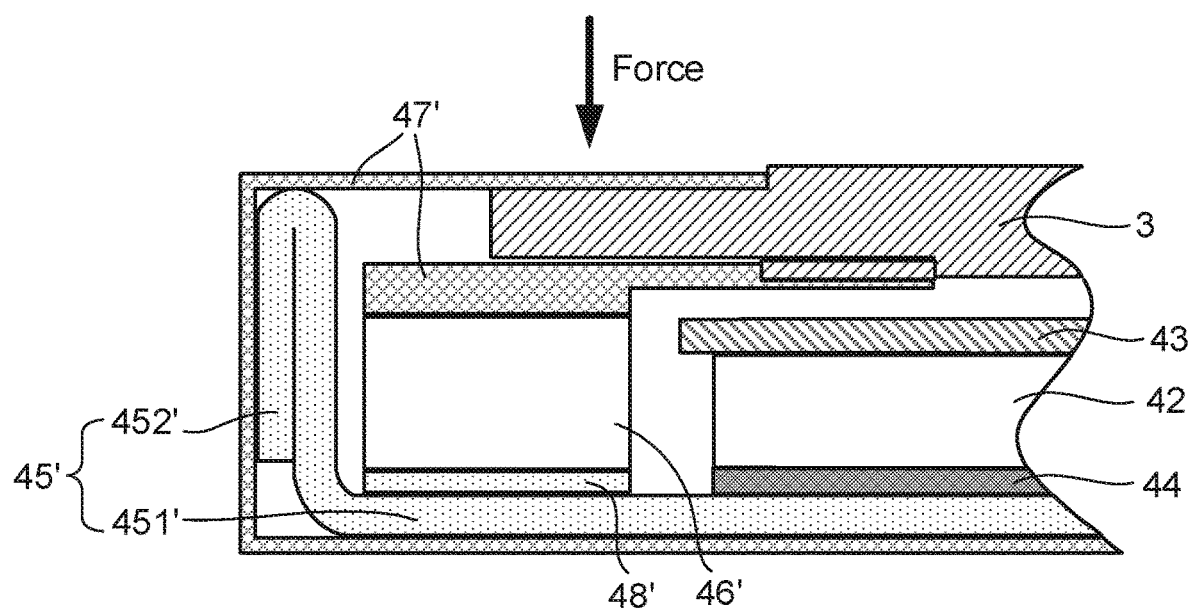
FIG. 3 is a diagram of a backlight module in the related art.

As shown in FIG. 3, in the related art, the backlight module 4 further includes a support frame 45', a mold frame 46' and a light-shielding tape 47', all of which are used to fix the light guide plate 42, the optical films 43 and the reflective sheet 44. The base plate 451' and side walls 452' of the support frame 45' are connected to form an accommodating space for receiving the light guide plate 42, the optical films 43 and the reflective sheet 44. The mold frame 46' is disposed in a gap between the side walls 452' and the light guide plate 42. A side of the mold frame 46' is connected to the base plate 451' through a mold frame fixing tape 48', and an opposite side of the mold frame 46° is connected to the display panel 3 through the light-shielding tape 47'. The mold frame 46' is used for supporting the display panel 3 to achieve an assembly of the backlight module 4 and the display panel 3.

However, when the display panel 3 is subject to a force, for example, a downward force represented by an arrow in FIG. 3, since the mold frame 46' has a solid structure, it has a very limited buffering effect on the downward force. As a result, the display panel 3 may be easily damaged by the downward force. In addition, the light guide plate 42 may expand in an environment of high temperature and high humidity, but the mold frame 46', which is disposed around the light guide plate 42, occupies the deformation space of the light guide plate 42 in the lateral direction, which may limit the expansion of the light guide plate 42 in the lateral direction and intensify an expansion of the light guide plate 42 in the longitudinal direction, so that the light guide plate 42 may be closer to the display panel 3. As a result, the optical films 43 disposed on a side of the light guide plate 42 proximate to the display panel 3 is pushed up to be in contact with the display panel 3, thereby causing an abnormal display of the display panel 3. Moreover, special mechanical equipment and molds are needed to form the mold frame 46' and the cost is relatively high.

In addition, the structure of the support frame 45' in the backlight module 4 and a manner in which the support frame 45' is assembled with components in the display device 10 such as the light guide plate 42 and the display panel 3 may affect severity of the above damage and a frequency of the abnormal display.

In some embodiments of the present disclosure, a back plate 45 is provided, which may be applied to the backlight module 4.

Referring to FIGS. 4A to 8, the back plate 45 includes a base plate 45A, a plurality of support plates 45B and a plurality of connecting plates 45C. The base plate 45A includes a first surface and a second surface opposite to the first surface. The plurality of connecting plates 45C are fixed to at least two edges E of the base plate 45A, and each connecting plate 45C extends along a direction substantially perpendicular to the first surface. Each support plate 45B is fixed to an end of a respective one of the plurality of connecting plates 45C away from the base plate 45A, and is parallel to or substantially parallel to the first surface.

Figure 4A:
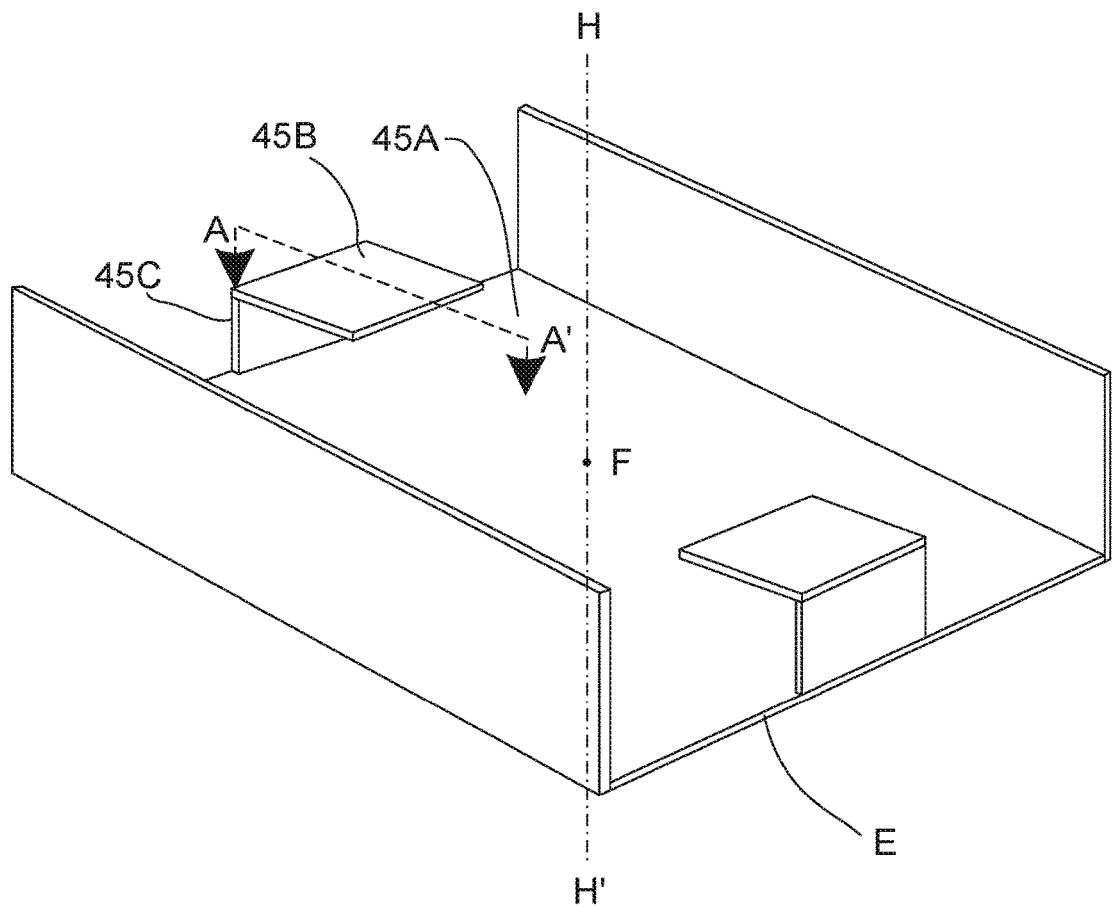
FIG. 4A is a perspective view of a back plate, in accordance with some embodiments.
Figure 4B:
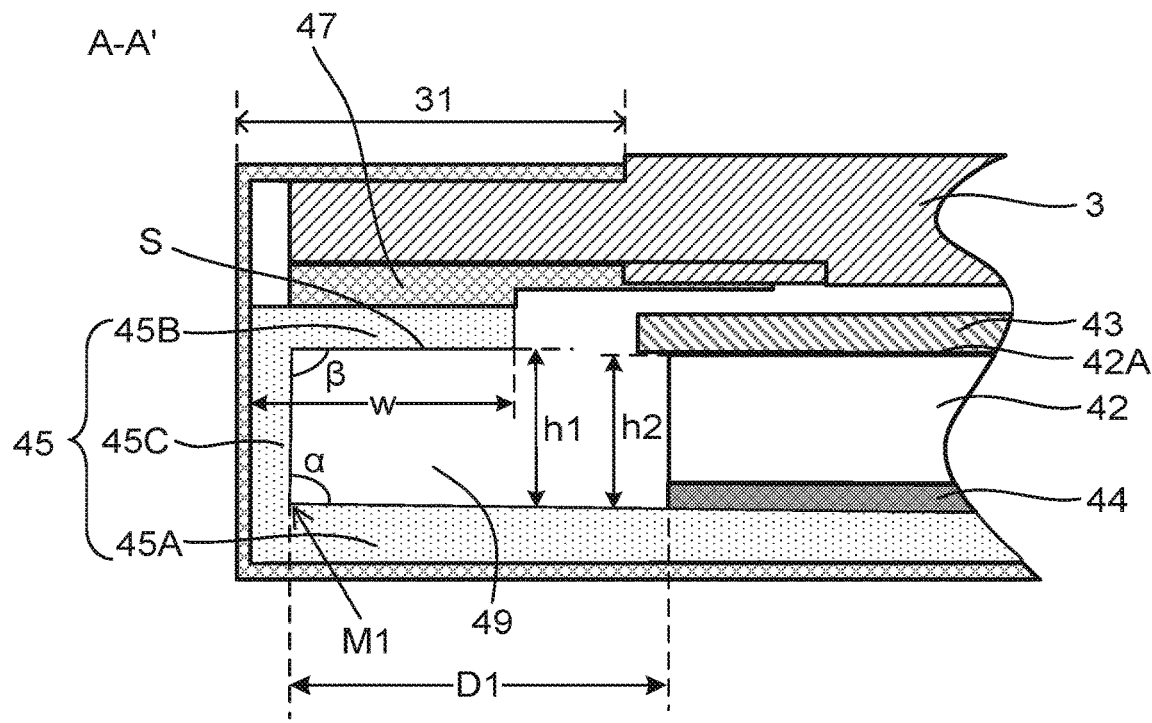
FIG. 4B is a partial sectional view of a backlight module, in accordance with some embodiments.
Figure 5A:
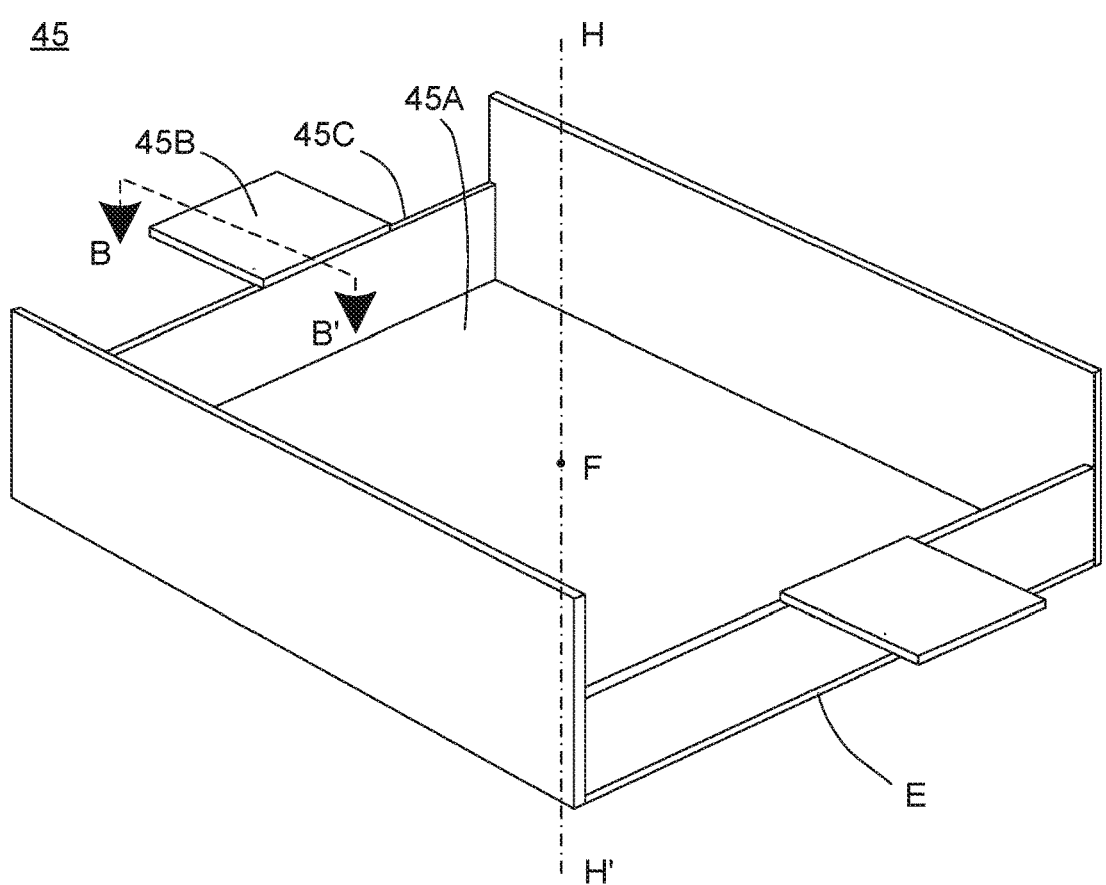
FIG. 5A is a perspective view of another back plate, in accordance with some embodiments.
Figure 5B:
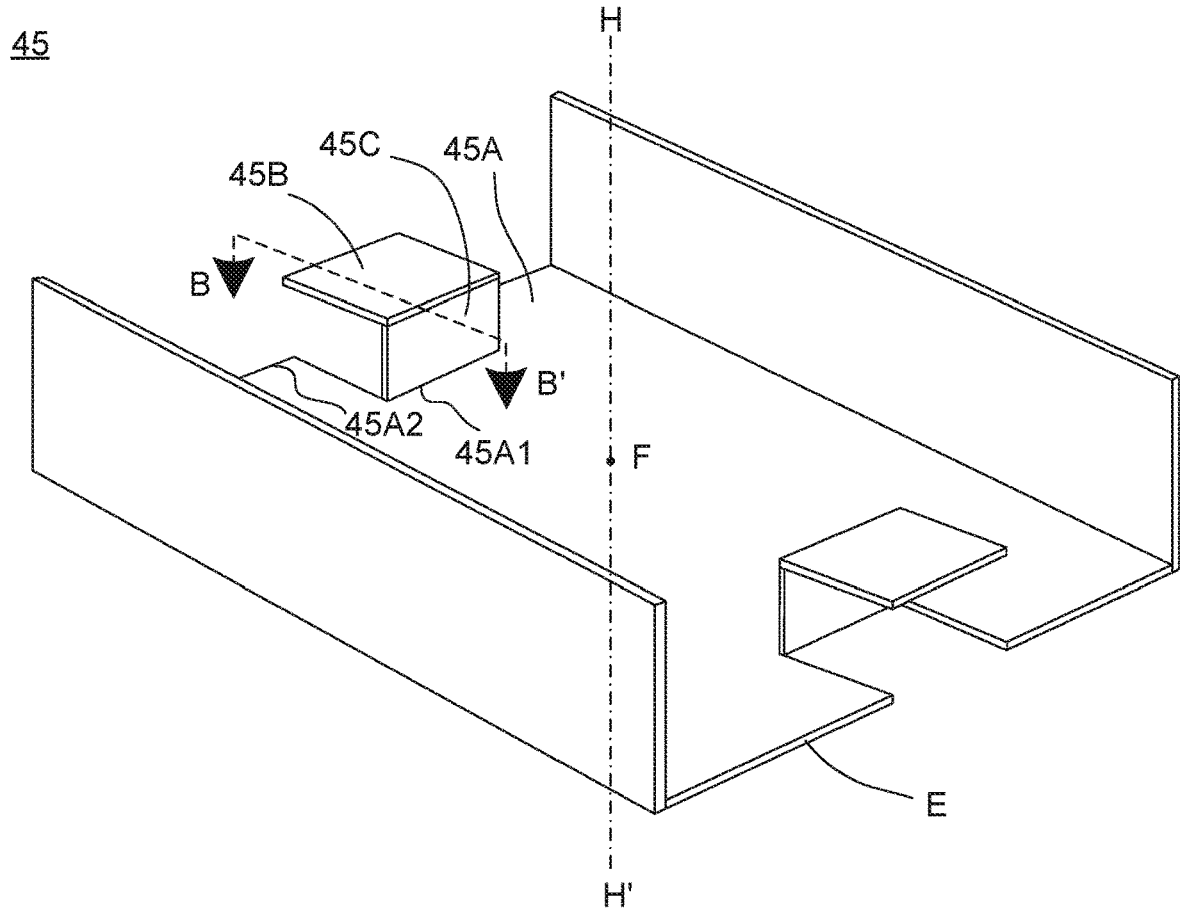
FIG. 5B is a perspective view of yet another back plate, in accordance with some embodiments.
Figure 5C:
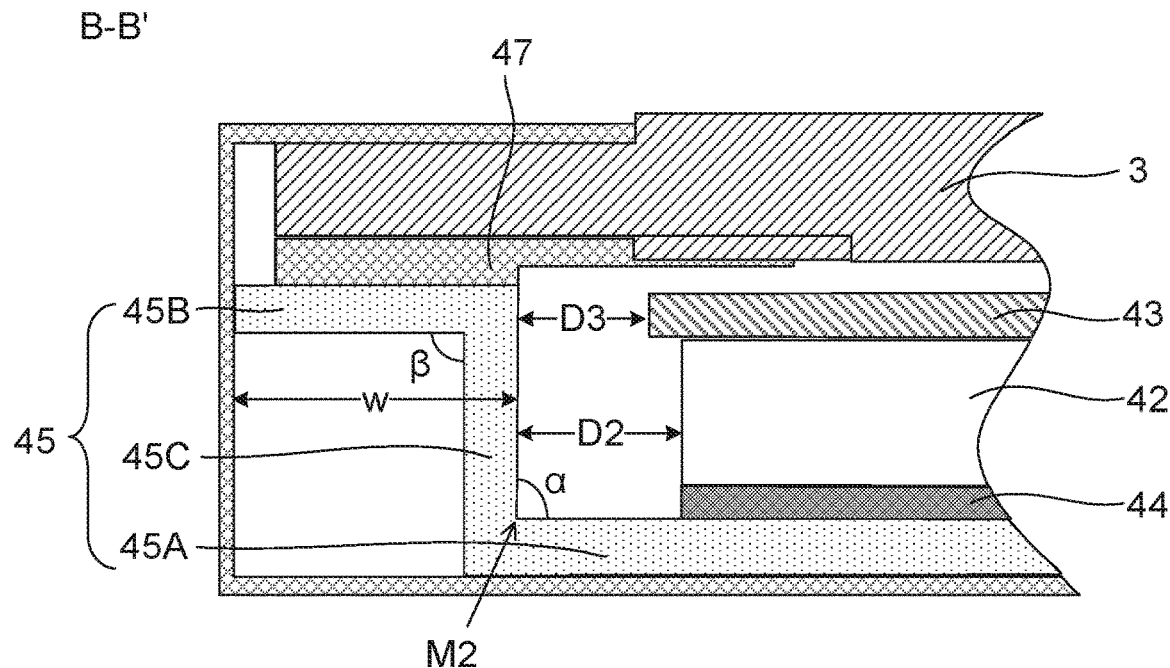
FIG. 5C is a partial sectional view of another backlight module, in accordance with some embodiments.

As shown in FIGS. 4B and 5C, the base plate 45A is configured to carry the light guide plate 42 of the backlight module placed thereon. Each support plate 45B may be configured to support the display panel 3.

Since each support plate 45B is connected to the base plate 45A via a corresponding connecting plate 45C instead of any solid structure such as a mold frame, there is a relatively large space between the support plate 45B and the base plate 45A, which can be used as a buffer space. When the display panel 3 is subject to a downward force, the space between each support plate 45B and the base plate 45A allows an end of the support plate 45B away from the connecting plate 45C to move downward by a certain distance, which in turn allows the display panel 3 to move downward by a certain distance, thereby preventing the display panel 3 from being damaged by the downward force.

In addition, after the downward force applied to the display panel 3 disappears, the end of each support plate 45B away from the connecting plate 45C can move upward, which may make the display panel 3 return to its original position. In other words, the support plates 45B may serve as a buffer for the display panel 3 when the downward force is applied to the display panel 3, which may ensure that the display panel 3 returns to its original position and may protect the display panel 3, thereby improving a reliability of the display panel 3. It will be noted that the foregoing downward force is a force along a direction pointing to the back plate 45 from the display panel 3, and that "move upward" means to move in a direction pointing to the display panel 3 from the back plate 45.

In addition, since the support plate 45B may support the display panel 3, there is no need to arrange the mold frame 46' or the mold frame fixing adhesive 48', which may simplify a process and reduce costs.

As shown FIGS. 4A, 5A and 5B, in some embodiments, each of the plurality of support plates 45B extends in a direction pointing to a central axis HH' of the base plate 45A or a direction away from the central axis HH' of the base plate 45A. The central axis HH' of the base plate 45A (represented by a dashed line) is a line that is perpendicular to the first surface of the base plate 45A and passes through a center F of the base plate 45A.

It will be noted that an edge of the base plated 54A may be provided with one or more connecting plates 45C and one or more corresponding support plates 45B.

In some embodiments, the plurality of connecting plates 45C are disposed on at least two opposite edges of the base plate 54, and each edge is provided with at least one connecting plate 45C and at least one support plate 45B. For example, referring to FIGS. 4A, 5A and 5B, the plurality of connecting plates 45C includes two connecting plates 45C disposed on two opposite edges of the base plate 54, and each edge is provided with one connecting plate 45C and one support plate 45B.

The base plate 45A may have two groups of edges, three groups of edges or four groups of edges, and each group of edges includes two opposite edges.

In some examples, a length of a support plate 45B disposed above each edge E (i.e., a dimension of the support plate 45B in an extending direction of the edge E) is less than or equal to a length of the edge.

Referring to FIGS. 4A, 5A and 5B, descriptions will be made below by taking examples in which each of two opposite edges E of the base plate 45A is provided with one support plate 45B and one connecting plate 45C. Here, each support plate 45B has a connecting end connected to an end of a corresponding connecting plate 45C away from the base plate 45A.

In some examples, referring to FIGS. 4A and 4B, along a direction pointing to the central axis HH' of the base plate 45A from each support plate 45B, an end of the support plate 45B away from a corresponding connecting plate 45C (for example, an end of the support plate 45B opposite to the connecting end of the support plate 45B) is closer to the central axis HH' relative to the connecting end of the support plate 45B.

Referring to FIGS. 4A and 4B, the support plate 45B, the connecting plate 45C and a portion of the base plate 45A opposite to the support plate 45B form an accommodating space 49. The accommodating space 49 may receive the end of the light guide plate 42 proximate to the accommodating space 49 when the light guide plate 42 expands, and may allow an end of the support plate 45B to move downward when it is pressed down by the display panel 3.

Here, the accommodating space 49 provides a space for the light guide plate 42 to expand in the lateral direction. When the light guide plate 42 is in an environment of high temperature and high heat, the light guide plate 42 may expand in the lateral direction, and the end of the light guide plate 42 proximate to the connecting plate 45C may extend into the accommodating space 49. Therefore, an expansion of the light guide plate 42 in the longitudinal direction caused by the limitation on the lateral expansion may not be intensified, which may improve the abnormal display of the display panel 3 and improve the display effect of the display panel 3.

As shown in FIG. 4B, in order to make the accommodating space 49 larger, the support plate 45B may be arranged in a higher position relative to the light guide plate 42. For example, in a direction perpendicular to the first surface, a distance h1 between the first surface of the base plate 45A and a surface S of the support plate 45B proximate to the base plate 45A is greater than a distance h2 between the first surface of the base plate 45A and a surface 42A of the light guide plate 42 facing away from the base plate 45A.

In some other examples, referring to FIGS. 5A and 5B, along a direction pointing to each support plate 45B from the central axis HH' of the base plate 45A, the connecting end of the support plate 45B is closer to the central axis HH' relative to the end of the support plate 45B away from the corresponding connecting plate 45C (for example, the end of the support plate 45B opposite to the connecting end of the support plate 45B).

On this basis, for example, referring to FIG. 5A, an orthographic projection of the end of the support plate 45B away from the corresponding connecting plate 45C on a plane where the first surface of the base plate 45A is located is outside the base plate 45A.

For another example, referring to in FIG. 5B, an edge of the base plate 45A has a recess 45A1 extending into the base plate 45A. For example, each recess 45A1 is recessed in a direction toward the center F of the base plate 45A. The base plate 45A is connected to a connecting plate 45C at the recess 45A1, and an orthographic projection of the recess 45A1 on the plane where the first surface of the base plate 45A is located at least partially overlaps with an orthographic projection of a corresponding support plate 45B on the plane. For example, the orthographic projection of the recess 45A1 on the plane is within the orthographic projection of the corresponding support plate 45B on the plane. For another example, the orthographic projection of the corresponding support plate 45B on the plane is within the orthographic projection of the recess 45A1 on the plane. For another example, the orthographic projection of the corresponding support plate 45B on the plane partially overlaps with the orthographic projection of the recess 45A1 on the plane. For another example, the orthographic projection of the corresponding support plate 45B on the plane coincides with the orthographic projection of the recess 45A1 on the plane.

In addition, for example, an end face of the corresponding support plate 45B away from the connecting plate 45C is flush with an end face of the base plate 45A except the recess 45A1 (for example, the end face of the non-recessed portion 45A2).

Here, in a case where the backlight module including the back plate 45 shown in FIG. 5B is assembled with the display panel 3, an outermost edge of the base plate 45A (i.e., an edge of the non-recessed portion 45A2) of the back plate 45 is substantially flush with a corresponding edge of the display panel 3. As a result, it is convenient to attach light-shielding tapes 47 to edges of the display panel 3 and the backlight module during an assembly process of the backlight module and the display panel 3.

Figure 6:
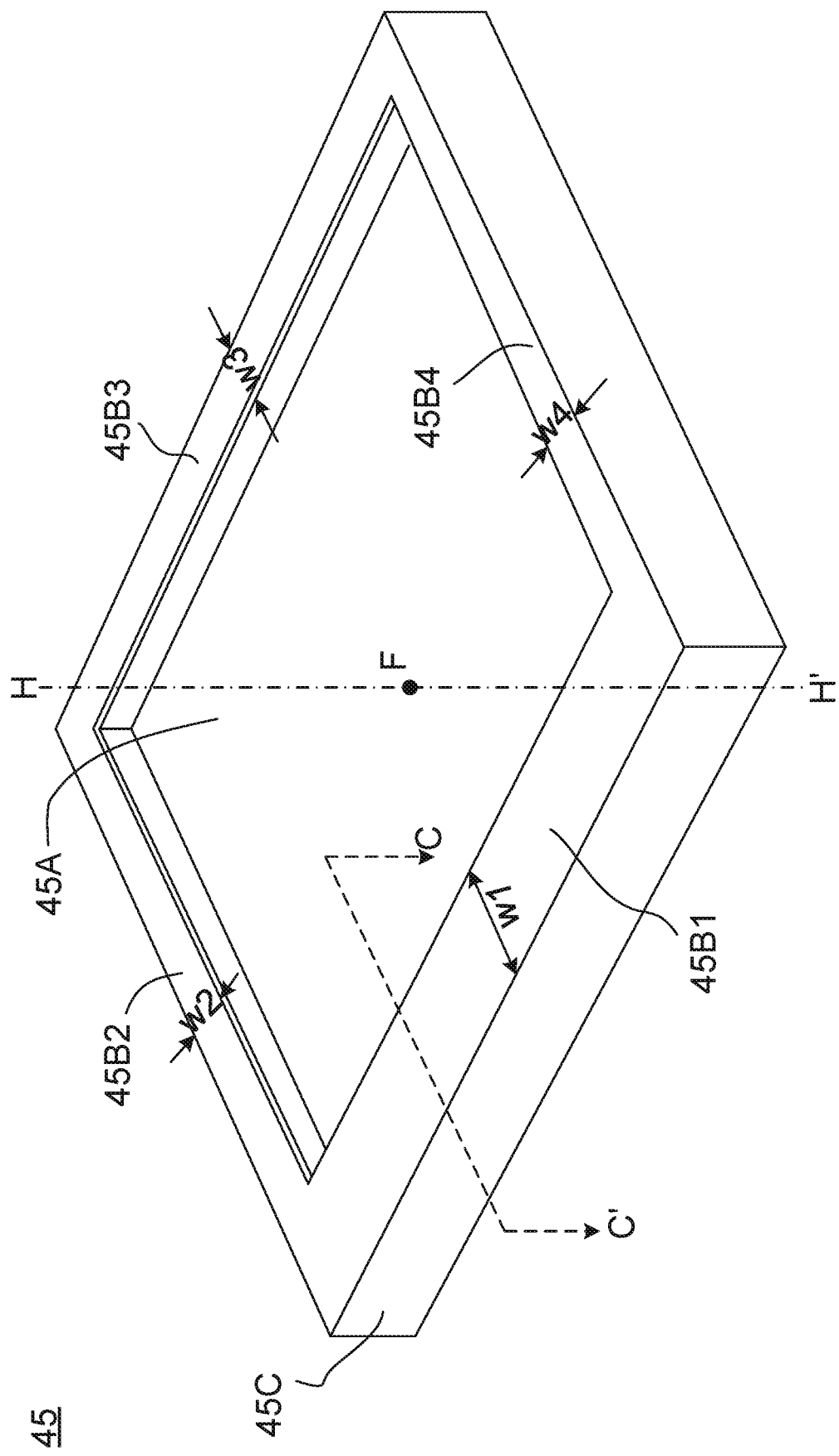
FIG. 6 is a perspective view of yet another back plate, in accordance with some embodiments.

In the embodiments, as shown in FIG. 6, the base plate 45A has two groups of edges E, and each group of edges E includes two opposite edges E. The back plate 45 includes four support plates 45B and four connecting plates 45C, and each edge E of the base plate 45A is provided with one support plate 45B and one connecting plate 45C.

On this basis, in some embodiments, as shown in FIG. 6, each support plate 45B extends in a direction pointing to the central axis HH' of the base plate 45A. The four support plates 45B includes a first support plate 45B1 and three second support plates 45B2, 45B3 and 45B4, and the first support plate 45B1 is configured to be provided closer to a light source of the backlight module than the three second support plates 45B2, 45B3 and 45B4.

A width of the first support plate 45B1 may be greater than each second support plate 45B2, 45B3 or 45B4. For example, as shown in FIG. 6, the width w1 of the first support plate 45B1 is greater than any of a width w2 of the second support plate 45B2, a width w3 of the second support plate 45B3 and a width w4 of the second support plate 4564.

It will be noted that, as shown in FIG. 6, the width of the support plate 45B refers to a distance between an edge of the support plate 45B at which the support plate 45B is connected to the connecting plate 45C and an opposite edge of the support plate 45B. For example, as shown in FIG. 6, the width w1 of the first support plate 45B1 is a distance between the upper edge of the first support plate 45B1 and the lower edge of the first support plate 45B1.

Figure 9:
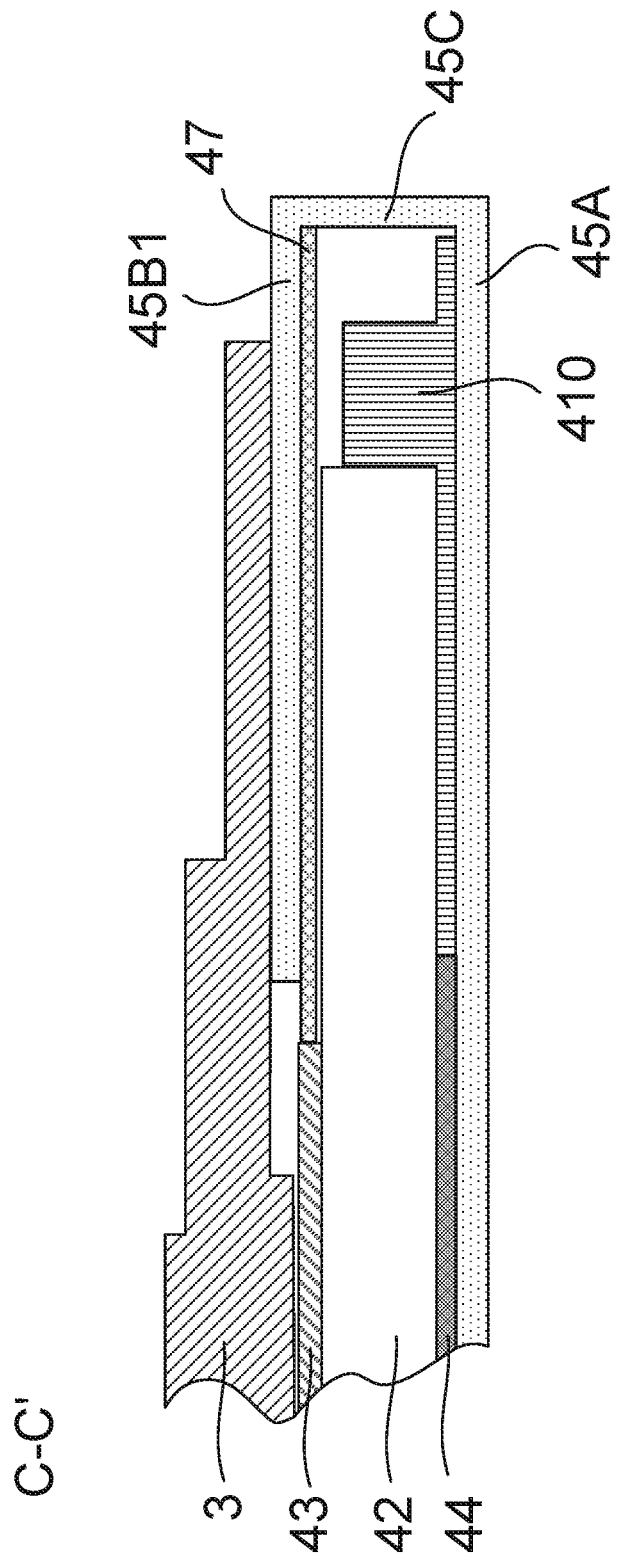
FIG. 9 is a partial sectional view of yet another backlight module, in accordance with some embodiments.

For example, as shown in FIG. 9 which shows a section view of the first support plate 45B1 of FIG. 6 taken along line CC' and components in the backlight module such as the light source, the light source 410 is arranged along the edge of the light guide plate 42 proximate to the first support plate 45B1, and the light source 410 is disposed between the first support plate 45B1 and the base plate 45A.

In order to prevent light leakage of the backlight module, a light-shielding tape 47 may be provided between the first support plate 45B1 and the light source 410.

In the above solution, by widening the width of the support plate 45B disposed closer to the light source of the backlight module than other support plates, when the light source emits light, non-uniform brightness of the display device (that is, the brightness of a certain region is higher than the brightness of other regions in the display device) may be avoided, which may improve a display effect of the display device.

In some examples, as shown in FIG. 6, every two adjacent support plates 45B are connected to each other, and the plurality of support plates 45 are integrally formed. That is, a structure of the plurality of support plates 45 may be a one-piece structure formed through one molding process.

When a width of each support plate 45B is fixed, since a total area of the support plates 45B may reach a maximum value as the length of each support plate 45B reaches a maximum value (that is, equal to the length of the edge), and the structure of the plurality of support plates 45B is the one-piece structure, strengths of the support plates 45B may be improved, which may make the support plates 45B better support the display panel 3.

In addition, in some examples, the base plate 45A, the plurality of connecting plates 45C and the plurality of support plates 45B are integrally formed.

Figure 7:
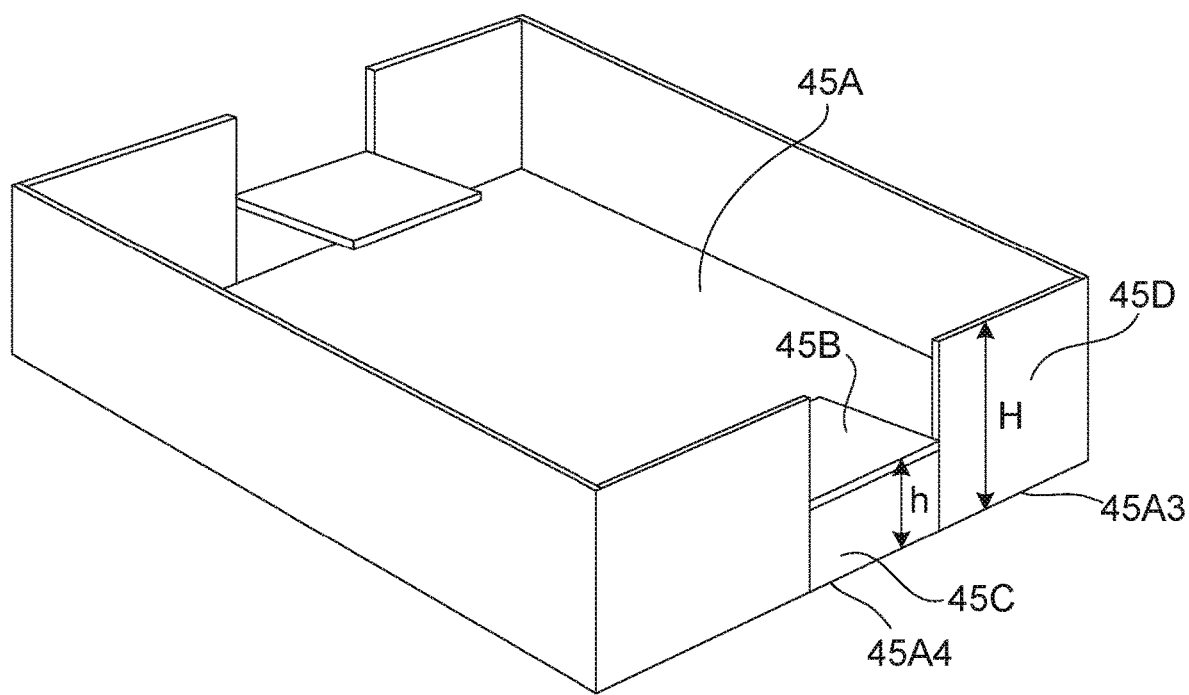
FIG. 7 is a perspective view of yet another back plate, in accordance with some embodiments.
Figure 8:
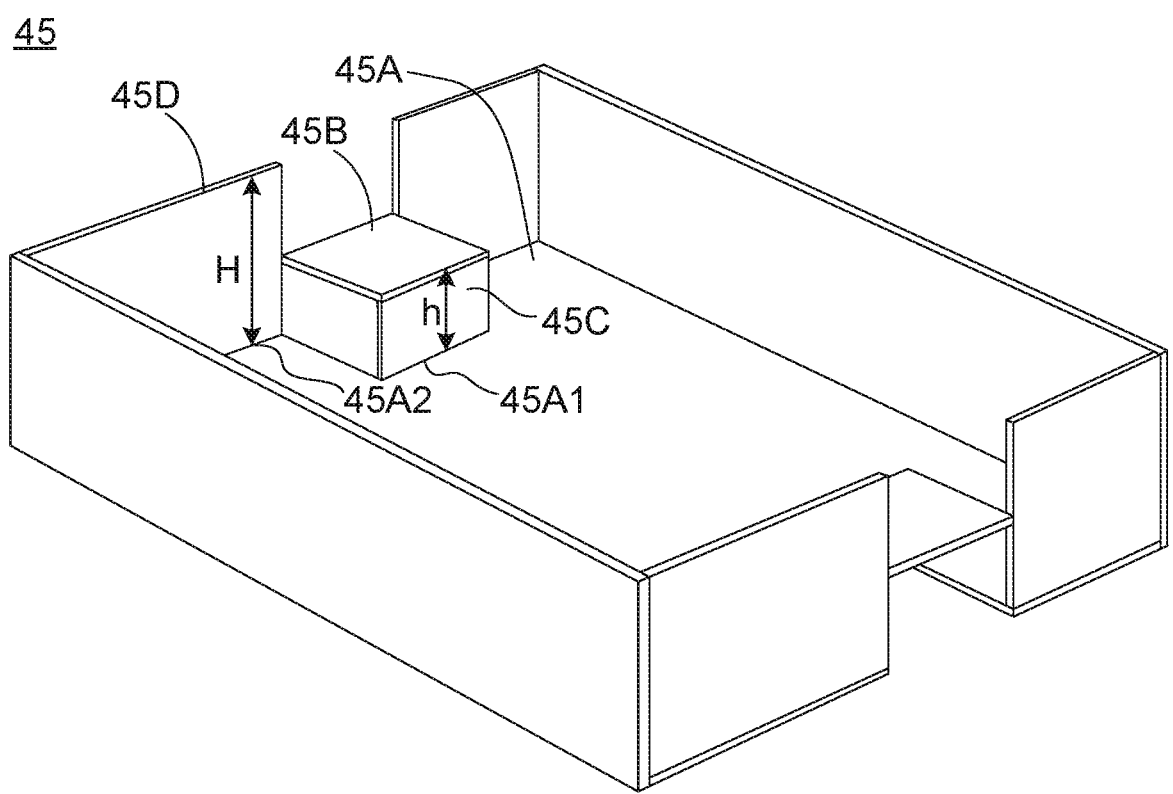
FIG. 8 is a perspective view of yet another back plate, in accordance with some embodiments.

In some embodiments, as shown in FIGS. 7 and 8, the back plate 45 further includes a plurality of limit plates 45D disposed on at least two opposite edges E of the base plate 45A where the connecting plates 45C are provided. Each edge E is provided with at least one limit plate 45D (FIGS. 7 and 8 illustrate an example in which each edge E is provided with two limit plates 45D). Portions of the base plate 45A connected to the limit plates 45D (45A3 in FIG. 7 and 45A2 in FIG. 8) do not overlap with portions of the base plate 45A connected to the connecting plates 45C (45A4 in FIG. 7 and 45A1 in FIG. 8).

As shown in FIGS. 7 and 8, in a direction perpendicular to the first surface of the base plate 45A, a distance H between the first surface and an end face of a limit plate 45D facing away from the base plate 45A (i.e., a height of the limit plate 45D) is greater than a distance h between the first surface of the base plate 45A and a surface of the support plate 45B facing away from the base plate 45A (i.e., a height of the support plate 45B), and is less than or equal to a distance between the first surface of the base plate 45A and a surface of the display panel 3 facing away from the base plate 45A.

Since the limit plate 45D may limit the position of the display panel 3, the assembly of the backlight module and the display panel 3 may be relatively easy, and an efficiency of the assembly may be improved.

For example, as shown in FIGS. 7 and 8, in a case where a length of the connecting plate 45C along the edge E of the base plate 45A is less than a length of the edge E of the base plate 45A, there may be two limit plates 45D disposed on each of the two opposite edges E. On each of the two opposite edges E, a sum of the lengths of the connecting plate 45C and two limit plates 45D may equal to the length of the edge E.

Referring to FIGS. 4B and 5C, in some embodiments, in a case where the widths of the support plates 45B (i.e., w in FIGS. 4B and 5C) are determined, the support plates 45B may be disposed in a non-display region 31 of the display panel 3, and the width of each support plate 45B is less than a width of the non-display region 31. In this way, the back plate 45 may be ensured not to affect the display effect of the display panel 3.

The width of the support plate 45B may be greater than or equal to 0.5 mm and less than or equal to 1.6 mm. For example, the width of the support plate 45B is 0.5 mm, 0.7 mm, 1.0 mm, 1.3 mm or 1.6 mm.

Referring to FIGS. 4B and 5C, in some embodiments, the connecting plate 45C and the base plate 45A have a first included angle α therebetween, and the support plate 45B and the connecting plate 45C have a second angle 13 therebetween.

To ensure that the support plate 45B is parallel or substantially parallel to the base plate 45A, the first included angle α and the second included angle β are close to or equal to a right angle. The first included angle α and the second included angle β may be in a range from 88° to 92°. For example, the first included angle α and the second included angle β are 88°, 90°, or 92°.

In some embodiments of the present disclosure, referring to FIGS. 4B and 5C, the backlight module 4 includes the back plate 45 in any embodiment described above and the light guide plate 42 disposed on the first surface of the base plate 45A of the back plate 45.

In some embodiments, as shown in FIG. 4B, at least one support plate 45B extends in a direction pointing to the central axis HH' of the base plate 45A, and along the central axis HH' of the base plate 45A, the distance h1 between the first surface of the base plate 45A and a surface of the support plate 45B proximate to the base plate 45A is greater than a distance h2 between the first surface of the base plate 45A and a surface of the light guide plate 42 facing away from the base plate 45A.

On this basis, in some embodiments, as shown in 4B, in at least one connecting plate 45C connected to the at least one support plate 45B, along a direction perpendicular to a plane that is perpendicular to the first surface of the base plate 45A and substantially parallel to a connecting plate 45C, a maximum distance D1 between a surface of the connecting plate 45C facing the light guide plate 42 and an end face of the light guide plate 42 proximate to the connecting plate 45C is greater than or equal to 0.8 mm, and less than or equal to 1.5 mm. For example, the maximum distance D1 may be 0.8 mm, 0.9 mm or 1 mm.

For example, as shown in FIG. 4B, if the connecting plate 45C has a surface facing away from the light guide plate 42, and the surface is perpendicular to the first surface of the base plate 45A, the described plane that is perpendicular to the first surface of the base plate 45A and substantially parallel to the connecting plate 45C is parallel to the surface of the connecting plate 45C facing away from the light guide plate 43. In this case, the maximum distance D1 may be the distance, in the direction perpendicular to this plane, between a position M1 on the connecting plate 45C where the connecting plate 45C is connected to the base plate 45A and the end face of the light guide plate 42 proximate to the connecting plate 45C.

In some embodiments, as shown in FIG. 5C, at least one support plate 45B extends in a direction away from the central axis HH' of the base plate 45A. In at least one connecting plate 45C connected to the at least one support plate 45B, along a direction perpendicular to the plane that is perpendicular to the first surface of the base plate 45A and substantially parallel to a connecting plate 45C, a maximum distance D2 between a surface of the connecting plate 45C facing the light guide plate 42 and an end face of the light guide plate 42 proximate to the connecting plate 45C is greater than or equal to 0.6 mm, and less than or equal to 1.5 mm, such as 0.6 mm, 0.7 mm or 0.8 mm. With regard to the maximum distance For example, as shown in FIG. 5C, if the connecting plate 45C has a surface facing away from the light guide plate 42, and the surface is perpendicular to the first surface of the base plate 45A, the described plane that is perpendicular to the first surface of the base plate 45A and substantially parallel to the connecting plate 45C is parallel to the surface of the connecting plate 45C facing away from the light guide plate 43. In this case, the maximum distance D2 may be the distance, in the direction perpendicular to this plane, between a position M2 on the connecting plate 45C where the connecting plate 45C is connected to the base plate 45A and the end face of the light guide plate 42 proximate to the connecting plate 45C.

In some embodiments, as shown in FIGS. 4B and 5C, the backlight module 4 further includes an optical film 43 disposed on a side of the light guide plate 42 away from the base plate 45A of the back plate 45.

Along the direction perpendicular to the plane that is perpendicular to the first surface of the base plate 45A and substantially parallel to a connecting plate 45C, a distance D3 between a surface of the support plate 45B facing the optical film 43 and an end face of the optical film 43 proximate to the support plate 45B is greater than or equal to 0.3 mm, and less than or equal to 1.5 mm.

In some embodiments, as shown in FIGS. 4B and 5C, in order to ensure the display effect of the display panel 3, after the light guide plate 42 and other components such as the optical film 43 are assembled with the back plate 45, the light-shielding tape 47 may be attached to a surface of the support plate 45B of the back plate 45 facing away from the base plate 45A to prevent light leakage of the backlight module.

Beneficial effects of the backlight module is the same as beneficial effects of the back plate 45 in some embodiments described above, and details will not be repeated herein again.

In some embodiments of the present disclosure, the display device includes the display panel 3 and the backlight module 4 described above. Referring to FIGS. 4B and 5C, the display panel 3 is disposed on a surface of each support plate 45B of the back plate 45 facing away from the base plate 45A in the backlight module 4. The support plate 45B may be used to support the display panel 3.The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A back plate, comprising:
a base plate including a first surface;
a plurality of connecting plates fixed to at least two edges of the base plate, each connecting plate extending along a direction substantially perpendicular to the first surface; and
a plurality of support plates, each support plate being fixed to an end of a respective one of the plurality of connecting plates away from the base plate, and being substantially parallel to the first surface, wherein
each support plate extends in a direction away from a central axis of the base plate, the central axis of the base plate is a line perpendicular to the first surface of the base plate and passing through a center of the base plate; and
an orthographic projection of an end of the support plate away from a corresponding connecting plate on a plane where the first surface of the base plate is located is outside the base plate.

2. The back plate according to claim 1, wherein the plurality of connecting plates are fixed to at least two opposite edges of the base plate, and each edge is provided with at least one connecting plate and at least one support plate.

3. The back plate according to claim 2, further comprising:
a plurality of limit plates fixed to the at least two opposite edges of the base plate, each limit plate extending along the direction substantially perpendicular to the first surface, and each edge of the at least two opposite edges being provided with at least one limit plate, wherein
in a direction perpendicular to the first surface, a distance between the first surface and an end face of a limit plate away from the base plate is greater than a distance between the first surface and a surface of the support plate facing away from the base plate.

4. The back plate according to claim 2, wherein the base plate has two groups of edges, and each group of edges includes two opposite edges; and
the back plate comprises four support plates and four connecting plates, and each edge of the base plate is provided with one support plate and one connecting plate.

5. The back plate according to claim 1, wherein a width of each support plate is greater than or equal to 0.5 mm, and less than or equal to 1.6 mm.

6. The back plate according to claim 1, wherein a connecting plate and the base plate have a first included angle therebetween, and the connecting plate and a corresponding support plate have a second included angle therebetween; and
the first included angle and the second included angle are greater than or equal to 88°, and less than or equal to 92°.

7. A backlight module, comprising:
the back plate according to claim and
a light guide plate disposed on the first surface of the base plate.

8. The backlight module according to claim 7, wherein at least one support plate extends in a direction away from a central axis of the base plate;
in at least one connecting plate connected to the at least one support plate, along a direction perpendicular to a plane that is perpendicular to the first surface and substantially parallel to a connecting plate, a maximum distance between an end face of the light guide plate proximate to the connecting plate and a surface of the connecting plate facing the light guide plate is greater than or equal to 0.6 mm, and less than or equal to 1.5 mm.

9. The backlight module according to claim 7, further comprising an optical film disposed on a side of the light guide plate away from the base plate, and along a direction perpendicular to a plane that is perpendicular to the first surface and substantially parallel to a connecting plate, a distance between a surface of a support plate facing the optical film and an end face of the optical film proximate to the support plate is greater than or equal to 0.3 mm, and less than or equal to 1.5 mm.

10. A display device, comprising:
a display panel; and
the backlight module according to claim 7, wherein
the display panel is disposed on a surface of each support plate facing away from the base plate in the backlight module.

11. The display device according to claim 10, wherein in a direction perpendicular to the first surface, a distance between the first surface and an end face of a limit plate away from the base plate is less than or equal to a distance between the first surface and a surface of the display panel facing away from the base plate.

12. A back plate, comprising:
a base plate including a first surface;
a plurality of connecting plates fixed to at least two edges of the base plate, each connecting plate extending along a direction substantially perpendicular to the first surface;
a plurality of support plates, each support plate being fixed to an end of a respective one of the plurality of connecting plates away from the base plate, and being substantially parallel to the first surface, wherein
each support plate extends in a direction away from a central axis of the base plate, the central axis of the base plate is a line perpendicular to the first surface of the base plate and passing through a center of the base plate; and
an edge of the at least two edges of the base plate has a recess extending into the base plate; the base plate is connected to a connecting plate at the recess, and an orthographic projection of the recess on the plane where the first surface is located at least partially overlaps with an orthographic projection of a corresponding support plate on the plane; and an end face of the corresponding support plate away from the connecting plate is substantially flush with an end face of the base plate except the recess.

13. The back plate according to claim 12, wherein the plurality of connecting plates are fixed to at least two opposite edges of the base plate, and each edge is provided with at least one connecting plate and at least one support plate.

14. The back plate according to claim 13, further comprising:
a plurality of limit plates fixed to the at least two opposite edges of the base plate, each limit plate extending along the direction substantially perpendicular to the first surface, and each edge of the at least two opposite edges being provided with at least one limit plate, wherein
in a direction perpendicular to the first surface, a distance between the first surface and an end face of a limit plate away from the base plate is greater than a distance between the first surface and a surface of the support plate facing away from the base plate.

15. The back plate according to claim 14, wherein the base plate has two groups of edges, and each group of edges includes two opposite edges; and
the back plate comprises four support plates and four connecting plates, and each edge of the base plate is provided with one support plate and one connecting plate.

16. A back plate, comprising:
a base plate including a first surface;
a plurality of connecting plates fixed to at least two edges of the base plate, each connecting plate extending along a direction substantially perpendicular to the first surface;
a plurality of support plates, each support plate being fixed to an end of a respective one of the plurality of connecting plates away from the base plate, and being substantially parallel to the first surface, wherein
the base plate has two groups of edges, and each group of edges includes two opposite edges; the back plate comprises four support plates and four connecting plates, and each edge of the base plate is provided with one support plate and one connecting plate; and
each of the four support plates extends in a direction pointing to a central axis of the base plate, and the four support plates includes a first support plate and three second support plates, a width of the first support plate is greater than a width of each second support plate, wherein
the central axis of the base plate is a line perpendicular to the first surface of the base plate and passing through a center of the base plate.

17. A backlight module, comprising:
the back plate according to claim 16; and
a light guide plate disposed on the first surface of the base plate, wherein
along the central axis of the base plate, a distance between the first surface and a surface of at least one support plate proximate to the base plate is greater than a distance between the first surface and a surface of the light guide plate facing away from the base plate.

18. The backlight module according to claim 17, wherein along a direction perpendicular to a plane that is perpendicular to the first surface and substantially parallel to a connecting plate, a maximum distance between an end face of the light guide plate proximate to the connecting plate and a surface of the connecting plate facing the light guide plate is greater than or equal to 0.8 mm, and less than or equal to 1.5 mm.

* * * * *

UNITED STATES PATENT AND TRADEMARK OFFICE
CERTIFICATE OF CORRECTION

PATENT NO. : 11,156,765 B2  
APPLICATION NO. : 16/902658  
DATED : October 26, 2021  
INVENTOR(S) : Dengqian Li et al.

Page 1 of 1

It is certified that error appears in the above-identified patent and that said Letters Patent is hereby corrected as shown below:

In the Claims

Claim 7 should read:
7. A backlight module, comprising:
the back plate according to claim 1; and
a light guide plate disposed on the first surface of the base plate.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*